Figure 1:
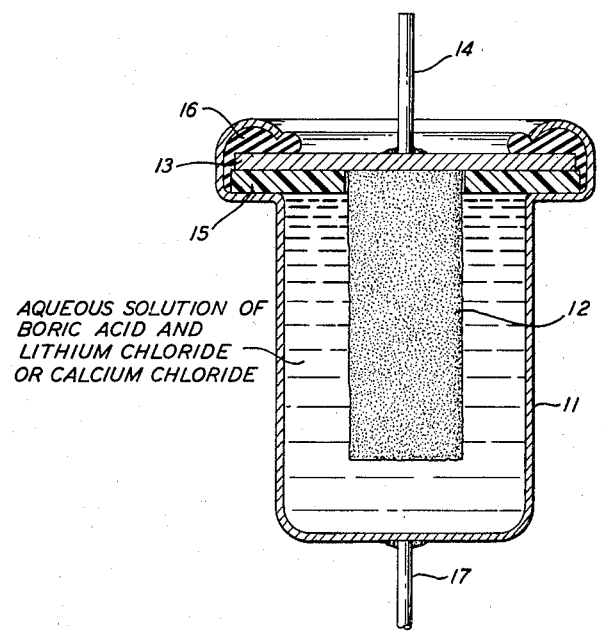

Nov. 25, 1958  H. E. HARING ET AL  2,862,157
ELECTROLYTIC CAPACITORS
Filed Sept. 14, 1956

INVENTORS. H. E. HARING
R. L. TAYLOR
BY
Edwin B. Cave
ATTORNEY

United States Patent Office 2,862,157
Patented Nov. 25, 1958

2,862,157

ELECTROLYTIC CAPACITORS

Horace E. Haring, Summit, and Raymond L. Taylor, Berkeley Heights, N. J., assignors to Bell Telephone Laboratories, Incorporated, New York, N. Y., a corporation of New York Application September 14, 1956, Serial No. 609,976

8 Claims. (Cl. 317—230)

This invention relates to electrolyte solutions and to electrolytic devices using such electrolyte solutions. More specifically, the invention relates to electrolyte solutions containing a buffering agent to regulate the hydrogen-ion concentration therein, and to electrolytic devices using such buffered electrolyte solutions.

The devices for which the novel solutions herein described are of greatest utility are electrolytic capacitors and rectifiers having at least one filmed metal electrode. Electrodes of tantalum, zirconium, titanium, niobium and similar film-forming metals have commonly been employed in such devices.

One successful and widely-used capacitor of such a type contains a filmed anode of porous tantalum, a cathode of silver, and employs an electrolyte which is an aqueous solution of lithium chloride. Lithium chloride as an electrolyte ingredient is taught in the patent to Raymond L. Taylor, No. 2,368,688, granted February 6, 1945. As there taught, lithium chloride solutions are excellent electrolytes because of their high conductivity, good film-forming and film-maintaining properties, their stability to decomposition, their non-corrosiveness, and, particularly, their low vapor pressure which inhibits loss of solvent by evaporation. These properties have led to the widespread adoption of the solutions as electrolytes.

The applicants have found, however, that the many advantages offered by lithium chloride solutions as electrolytes may be interfered with by reactions taking place within devices using such electrolytes. These reactions may change the nature of the electrolyte over a period of time, rendering the electrolyte and the device less utile in consequence. In particular, it has now been discovered that certain reactions within electrolytic capacitors and rectifiers containing lithium chloride electrolytes tend to render the electrolytes more and more alkaline. This increasing alkalinity eventually reaches a level at which the filmed anode of the device may be attacked. Some of the anode film may be dissolved and the electrical characteristics of the device thereby changed.

The applicants have further discovered that electrolytic devices employing lithium chloride electrolytes can be made more stable, and hence even more useful than before, by adding boric acid to the electrolyte solution. The boric acid neutralizes alkali produced within the device, and tends to maintain proper conditions of acidity within the device. Film attack is thus inhibited even though the cell is used for or at a period of time long after its manufacture.

Figure 2:
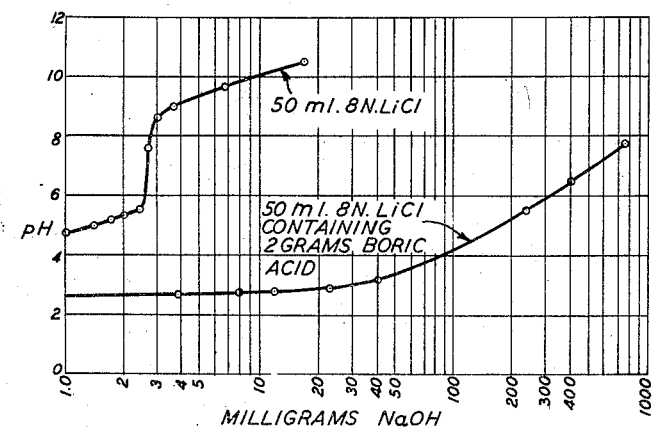

In the accompanying drawings:

Fig. 1 is a side elevation, in section, of an electrolytic capacitor in which the new electrolyte solutions here described have shown particular usefulness; and Fig. 2 is a graph comparing the variations in pH observed for a buffered and an unbuffered lithium chloride solution as sodium hydroxide is added to the solution.

In Fig. 1 is shown a capacitor comprising a cup-shaped container 11 of non-film-forming metal, such as silver, which serves as the capacitor cathode. Suspended within container 11 is filmed slug 12 of film-forming metal, as for instance porous tantalum, which is the capacitor anode. Slug 12 is affixed to disc 13 also of metal, preferably tantalum. Wire 14, preferably of tantalum on which slug 12 is crimped, is in electrical contact with disc 13 and slug 12. Wire 14 is the anodic lead which may be soldered or otherwise joined to other circuit components. Disc 13 is supported and kept out of electric contact with cathodic container 11 by annular ring 15, preferably made of a dielectric material, such as of polytetrafluoroethylene, for example. Ring 15, disc 13 and slug 12 are sealed within container 11 by sealing composition 16, which may be a rubber-base or plastic material, for example. The edges of container 11 are crimped over to seal container 11 tightly. A drop of solder on the bottom of container 11 is used to anchor negative lead 17. Finally, sealed within container 11 and in contact with both that cathode and anodic slug 12, is an electrolyte solution consisting of water with boric acid and lithium chloride or calcium chloride dissolved therein.

The graph in Fig. 2 shows pH as the scale of the ordinate, with milligrams of sodium hydroxide plotted logarithmically on the abscissa. One of the two curves shows the effect on solution pH of titrating 50 milliliters of an 8 N lithium chloride solution with alkali. The second curve shows the effect of titrating an equal amount of a similar solution additionally contianing 4 grams of boric acid per 100 milliliters of electrolyte. The solution containing the added boric acid absorbs much more alkali before reaching a neutral pH value of 7. Further, the pH of the solution containing boric acid changes pH only gradually as base is added, in contrast to the rapid pH changes observed for the unbuffered lithium chloride solution.

It is in capacitors of the type shown in Fig. 1 and described above that addition of boric acid to lithium chloride electrolytes has shown particular efficacy. The lithium chloride solutions used most commonly in the past for these capacitors have been prepared from commercially prepared lithium chloride. Samples of this commercial material sometimes show a pH less than 7 when dissolved in pure water. This initial acidity of purportedly pure lithium chloride solutions, which acidity is evident from the initial pH value for the unbuffered solution of Fig. 2, indicates the presence of some foreign acidic material in the salt. It is believed that the acid present is probably hydrochloric acid, remaining in small quantities from the process used to prepare the salt. It has been found that such initial acidity of unbuffered aqueous lithium chloride solutions is desirable. In fact, sources of the salt which give an acid product are to be preferred to commercial sources producing a pure neutral product or an alkaline-reacting material. By having an initially acid electrolyte solution, there is no immediate danger of attack of the anode film, which is acid resistant but soluble in alkali.

However, even though an initially acidic lithium chloride solution is employed, many of the capacitors so produced may eventually show instability of capacitance value due to an alkalinization of the electrolyte solution with time. The film on the anode, which is determinative of the device characteristics, is being attacked by alkali.

The effect of alkali on a filmed tantalum anode is indicated in Table I below. The data there given were obtained on formed tantalum anodes whose capacitances were measured before and after suspension of the anodes in solutions of sodium hydroxide at 100° C., of varying concentrations, for varying time periods as indicated.

Table I

| NaOH concentration, percent | Duration of test, hours | Capacitance (in microfarads) | |
|---|---|---|---|
| | | Initial | Final |
| 20 | ½ | 4.30 | 97 |
| 10 | 3 | 4.18 | 68 |
| 5 | 17 | 4.30 | 100 |
| 4 | 22 | 4.76 | 53 |
| 2 | 239 | 4.20 | 5.80 |
| 1 | 258 | 3.83 | 3.86 |

In each case, the capacitance of the anodes has increased. Since the capacitance of the films is an inverse measure of film thickness, increased capacitance indicates removal of some of the film of tantalum oxide covering the anodes.

That the change in capacitance observed above is to be attributed to the overly alkaline characteristic of the solutions becomes more apparent when it is noted that when nine newly-manufactured capacitors, in which the electrolyte solution was initially acid, were heated at 100° C. for 90 days, without voltage, the increase in capacitance observed after about 2160 hours averaged only 0.02 microfarad. Shorting the leads had no effect on accelerating deterioration.

Increase in alkalinity, with attack of the filmed anode, may also be responsible for high leakage currents in capacitors. Those of the nine freshly acid capacitors mentioned above which showed highest and lowest leakage currents after 90 days' heating at 100° C. were opened to determine their pH. The results, for capacitors both with shorted leads and on open circuit, are given below in Table II. It may be significant that the highest leakage current appears in the capacitor whose electrolyte has the highest pH, and the lowest leakage current is observed in the most acid electrolyte solution.

Table II

| 90 days at 100° C. | Leakage current after 1 minute's electrification at 60 volts | pH |
|---|---|---|
| Open circuit | 1 μ ampere | 7.5 |
| | 16 μ amperes | 10.5 |
| Leads shorted | 1.5 μ amperes | 9.0 |
| | 6 μ amperes | 10.0 |

For these samples, the pH's of all the electrolytes were distinctly alkaline at the end of the test. Capacitance values, however, as noted earlier, had not yet begun to change significantly for any of these samples.

It is believed that the increasing alkalinity of the electrolyte solutions here discussed may be due to at least two factors. First, there may be a decrease in hydrogen ion content of the electrolyte through cathodic discharge of the ion to form gaseous hydrogen, which with subsequent loss of the generated gas through the capacitor seal, results in a hydrogen ion-hydroxyl ion imbalance producing alkaline solutions. Second, corrosion of the silver cathode of the capacitor by oxygen diffusing into the capacitor may lead to direct production of hydroxyl ion.

During operation of the capacitor, leakage current passing through the capacitor may result in electrolytic decomposition of water, giving gaseous hydrogen at the cathode and gaseous oxygen at the anode. Under favorable conditions, much of the gas produced at either electrode will be later recombined by oxidation reduction processes at the electrodes to reform water.

At the anode, competing reactions, such as oxidation of tantalum to tantalum oxide for repair of the anode film, or generation of chlorine, may decrease the number of equivalents of gaseous oxygen liberated to a value below the number of equivalents of gaseous hydrogen produced at the cathode. The oxygen liberated at the anode, further, may be depleted by reaction with the silver casing:

$$4Ag + O_2 + 4LiCl + 2H_2O \rightarrow 4AgCl + 4LiOH$$

These reactions may leave an excess of hydrogen, as compared with oxygen available for recombination in the electrolyte, much of which is permanently lost from the capacitor by diffusion through the capacitor seal. By this removal of gaseous hydrogen, a permanent depletion of hydrogen ion in the electrolyte takes place rendering the solution alkaline.

Regardless of whether the capacitor is operating or idle, the oxidation of silver by oxygen, $$4Ag + O_2 + 4LiCl + 2H_2O \rightarrow 4AgCl + 4LiOH$$

may go on. When the capacitor is idling, oxygen from the atmosphere may diffuse into the capacitor through the seal, and by reacting with the casing increase the hydroxyl-ion content of the electrolyte. Such a mechanism will explain the observation that alkaline solutions are often found in capacitors which have not been at all used, but which, nevertheless, show deterioration on the shelf.

Other reactions, chemical and electrochemical, of an unknown nature, may also be operative in increasing electrolyte alkalinity.

Whatever the mechanisms and reactions whose existence can be postulated as producing alkalinity, attack of anode films by alkaline solutions is most damaging when the electrolyte has a pH greater than 9. It is thus desirable to maintain a pH lower than this value, or preferably, lower than pH 8. As mentioned earlier above, in formulating the electrolyte solution, use of a grade of commercial lithium chloride which gives an acid reaction—a pH less than 7—when dissolved in water is preferred. By having an initially acid electrolyte, some alkali will be harmlessly neutralized as it is produced. Until this initially present acid is entirely consumed, and until the pH then rises above a value of 8 or 9, the capacitor will function well.

One possible method of preventing decomposition of the anode film by generated alkali would be to make the electrolyte solution strongly acidic by the addition of hydrogen ion to the electrolyte as a strong acid. However, such practice would produce a corrosive solution which is undesirable since accidental leakage of the electrolyte may occur during operation with damage to other circuit elements. Also, the manufacture of electrical devices employing such corrosive, highly-acid, solutions is fraught with hazards to employees handling the devices or solutions during manufacture.

The addition of a weak, only partially ionized acid, particularly boric acid, solves the problem of combatting increasing alkalinity without introducing the disadvantages normally found with strong acids. Only part of the total potentially available hydrogen-ion supply present is in solution at a time, the remaining neutralizable hydrogen being found in the unionized acid dissolved in the electrolyte. As large an amount of neutralizable hydrogen ion as might be made available with strong acids can thus be introduced into the electrolyte without the developement of highly acidic, highly corrosive, and dangerous solutions.

Further, weak acids in solution exhibit buffer action, as is known in the art. In such solutions, the hydrogen-ion concentration remains relatively invariant, despite neutralization of portions of the weak acid by addition of a base thereto. This buffering action of boric acid is evident in Fig. 2 above. Such buffered solutions, thus, tend to maintain a fairly constant solution environment within the capacitor or rectifier, further aiding in the stabilization of device characteristics.

As a weak buffering acid almost any weak acid which, when mixed with one of its soluble salts, will show and maintain a pH below 9, or preferably below 8, may be used. However, a further important requirement is that the acid not show unwanted side reactions. Such reactions may be either purely chemical, with the remaining contents of the electrolyte solution or the materials of the anode and cathode, or electrochemical, on passage of current through the device.

As a weak acid, boric acid has been found extremely useful as an additive. It is free of undesirable side reactions, easily available commercially, and will maintain a relatively invariant pH of a value below 8 or 9 despite the addition of alkali, until the acid is consumed. This behavior is shown in Fig. 2 of the accompanying drawings.

The amount of acid to be added to an electrolyte solution is a matter much in the discretion of one practicing the invention, and is dependent to some extent on the temperature range through which the capacitor, rectifier or other electrolytic device is to be used.

It is, of course, advantageous to have a maximum number of equivalents of acid available for neutralization of alkali produced by the cell during storage or in use. Some weak acids suitable for addition as buffers may have, however, only a limited solubility in water. The presence of these acids in quantities in excess of their solubility may, in some cases, be found undesirable, since solid matter may then be present in the electrolyte solution. If present in a large enough quantity, such solids may interfere with regular operation of the device.

For boric acid, the most satisfactory of the weak acids for use as a buffer, solutions saturated with the acid at temperatures up to and including room temperature, about 25° C., are suitable for use also at temperatures as low as minus 50° C. Even though some precipitation of the acid occurs on cooling below the temperature at which the solution is saturated, the boric acid crystals formed do not interfere with normal operation of capacitors using these solutions, even at temperatures of minus 50° C.

For electrolyte solutions containing between 8 moles and 10 moles of lithium chloride per liter of solution, boric acid may be added in amounts up to about 5 grams per 100 milliliters of electrolyte. This is the approximate limit of solubility of boric acid in lithium chloride solutions of this concentration at room temperature. Even the smallest amount of boric acid added will have some buffering action and furnish hydrogen ions for neutralizing alkali. However, amounts of boric acid in excess of one-half percent will usually be added to increase the lifetime of devices using the solutions by increasing the total available neutralizable hydrogen ion. Thus an initial boric acid concentration may range from trace amounts up to 5 grams per 100 milliliters of electrolyte, though it is more common to employ solutions containing between one-half gram and 5 grams or between one gram and 4½ grams of boric acid per 100 milliliters of electrolyte. For operation at temperatures as low as minus 50° C., electrolytes having an initial boric acid concentration of the optimum value of 4 grams in 100 milliliters of electrolyte give specially good results in capacitors used at such low temperatures.

It has been understood that the electrolyte solutions to which the buffer acid, in particular boric acid, has been added are solutions containing from 34 grams to 42 grams of lithium chloride per 100 milliliters of solution. Such solutions contain lithium chloride at a concentration of about 8 molar to 10 molar. This concentration of lithium chloride is most common for capacitor electrolytes. However, as taught in the aforementioned patent to Taylor No. 2,368,688, various other concentrations of lithium chloride may be used, depending on the conductivity and vapor pressure desired for the resulting solution. As taught in the patent mentioned, a substantial amount of the salt should be employed. At room temperature, up to about 13 moles of lithium chloride will dissolve in one liter of water. Polar solvents other than water may also be used in making up the electrolyte solutions, though water is the most advantageous. For these other concentrations of lithium chloride, as well as for solutions of the chloride in polar but non-aqueous solvents, the same proportions of boric acid may be used as have been described for the 8 molar to 10 molar solutions specifically discussed above. Still other solutes may be added to the electrolyte solutions if desired.

Another ionogen comparable with lithium chloride and having the same high solubility and vapor-pressure-lowering properties as that salt is calcium chloride. This material may be used as an alternative to lithium chloride in preparing filmed capacitor or rectifier electrolytes, as it exhibits many of the same desirable properties. For calcium chloride solutions also, boric acid addition is desirable to maintain a relatively acid or only weakly alkaline condition. The same concentrations of acid in such electrolytes may be used as have been already described for lithium chloride electrolytes.

In the preparation of electrolyte solutions containing calcium chloride as an ionogen, such amounts of the salt are preferably used as give a lowering of the solution vapor pressure to correspond with the lowering observed for an 8 molar to 10 molar LiCl solution. For calcium chloride, solutions with concentrations between 2 molar and 5 molar, preferably between 3 molar and 4 molar, in calcium chloride are used. Solutions of calcium chloride with concentrations between 2 molar and 5 molar may be prepared by dissolving between about 222 grams and about 555 grams of anhydrous calcium chloride, $CaCl_2$, in one liter of water. Solutions in the preferred range of concentrations, between 3 molar and 4 molar, may be prepared by dissolving between about 333 grams and about 444 grams of the anhydrous salt in one liter of water.

Both LiCl and $CaCl_2$ are deliquescent salts, and it is this property of the salts which makes them particularly useful in formulating electrolyte solutions. The great affinity of the salts for water counterbalances the tendency of water to escape from the salts, or solutions of the salts, by evaporation. By equilibration of these counteracting tendencies it is possible to prepare electrolyte solutions which will not lose solvent water to the atmosphere to the point of dryness.

Thus, for example, the electrolyte solutions of LiCl and $CaCl_2$ given above contain such concentrations of the deliquescent salts as will give the solutions a vapor pressure roughly correspondent with the average partial pressure of water vapor in the atmosphere. If the electrolyte is used where the ambient humidity is greater than the vapor pressure of the electrolyte solution, the solution will absorb moisture until again in equilibrium with the atmosphere. Where the surrounding atmosphere contains water vapor at a partial pressure lower than the vapor pressure over the electrolyte, solvent water will be lost from the electrolyte until equilibrium is reached. Non-deliquescent salts, unlike LiCl and $CaCl_2$, rarely lower the vapor pressures of their solutions, even when present at saturating concentrations, to values comparable with average atmospheric partial pressures of water vapor. Since, for most such non-deliquescent salts, the vapor pressure of their solutions is in excess of the partial vapor pressure of water in the surrounding atmosphere, even when the solutions are saturated, solvent is continually lost from the solution by evaporation. Capacitors containing electrolytes made with such non-deliquescent salts may eventually dry out so severely as to become inoperative.

Though specific embodiments have been shown and described herein, it is to be understood that they are illustrative only, and not limiting on the scope and spirit of the invention.

What is claimed is:

1. In an electrolytic device comprising an electrode of film-forming metal, another electrode, and an electrolyte contacting the electrodes, an electrolyte comprising a solution of boric acid and a salt which is a member of the class consisting of lithium chloride and calcium chloride.

2. In an electrolytic device comprising an electrode of film-forming metal, another electrode, and an electrolyte contacting the electrodes, an aqueous electrolyte solution containing between about 8 moles and about 10 moles of lithium chloride per liter of solution and boric acid to saturate the solution.

3. In an electrolytic device comprising an electrode of film-forming metal, another electrode, and an electrolyte contacting the electrodes, an aqueous electrolyte solution containing between about 8 moles and about 10 moles of lithium chloride per liter of solution and up to 5 grams of boric acid per 100 milliliters of solution.

4. In an electrolytic device comprising an electrode of film-forming metal, another electrode, and an electrolyte contacting the electrodes, an aqueous electrolyte solution containing between about 2 moles and about 5 moles of calcium chloride per liter of solution and up to 5 grams of boric acid per 100 milliliters of solution.

5. An electrolytic capacitor comprising an electrode of film-forming metal, another electrode, and, in contact with the electrodes, an aqueous electrolyte solution containing boric acid and a salt which is a member of the class consisting of lithium chloride and calcium chloride.

6. An electrolytic capacitor comprising a tantalum electrode having a film of tantalum oxide thereon, another electrode, and, in contact with the electrodes, an aqueous electrolyte solution containing between about 8 moles and about 10 moles of lithium chloride per liter of solution and boric acid to saturate the solution.

7. An electrolytic capacitor comprising a tantalum electrode having a film of tantalum oxide thereon, another electrode of silver, and, in contact with the electrodes, an aqueous electrolyte solution containing between about 8 moles and about 10 moles of lithium chloride per liter of solution and between one-half gram and 5 grams of boric acid per 100 milliliters of solution.

8. An electrolytic capacitor comprising a tantalum electrode having a film of tantalum oxide thereon, another electrode, and, in contact with the electrodes, an aqueous electrolyte solution containing betwene about 2 moles and about 5 moles of calcium chloride per liter of solution and up to 5 grams of boric acid per 100 milliliters of solution.

References Cited in the file of this patent

UNITED STATES PATENTS

| | | |
|---|---|---|
| 1,998,202 | Robinson | Apr. 16, 1935 |
| 2,368,688 | Taylor | Feb. 6, 1945 |
| 2,759,131 | Ross | Aug. 14, 1956 |